United States Patent
Stevenson et al.

(10) Patent No.: US 6,302,578 B1
(45) Date of Patent: Oct. 16, 2001

(54) BEHIND THE BRICK THERMOCOUPLE

(75) Inventors: John S. Stevenson, Yorba Linda; Kent W. Santos, Buena Park; Gus Zachariou, Long Beach, all of CA (US)

(73) Assignee: Texaco Inc., White Plain, NY (US)

( * ) Notice: Subject to any disclaimer, the term of this patent is extended or adjusted under 35 U.S.C. 154(b) by 0 days.

(21) Appl. No.: 09/407,502

(22) Filed: Sep. 28, 1999

Related U.S. Application Data

(60) Provisional application No. 60/102,419, filed on Sep. 30, 1998.

(51) Int. Cl.[7] ............................................ G01K 7/00
(52) U.S. Cl. .................................. 374/179; 374/141
(58) Field of Search .................................. 374/141, 179; 48/92, 198.2

(56) References Cited

U.S. PATENT DOCUMENTS

| | | | |
|---|---|---|---|
| 2,818,326 | 12/1957 | Eastman et al. | 48/196 |
| 3,975,212 | 8/1976 | Haupin et al. | 136/232 |
| 4,483,932 | 11/1984 | Washburn et al. | 501/117 |
| 4,776,705 | * 10/1988 | Najjar et al. | 374/139 |
| 4,871,263 | * 10/1989 | Wilson | 374/139 |
| 4,984,904 | * 1/1991 | Nakano et al. | 374/139 |
| 5,005,986 | 4/1991 | Najjar et al. | 374/179 |
| 5,071,258 | * 12/1991 | Usher et al. | 374/140 |
| 5,147,137 | * 9/1992 | Thiesen | 374/139 |
| 5,209,571 | * 5/1993 | Kendrall | 374/179 |

FOREIGN PATENT DOCUMENTS

| | | | |
|---|---|---|---|
| 1041449A | 4/1990 | (CN) | G01K/7/02 |
| 1053291A | 7/1991 | (CN) | G01K/1/14 |
| 9109308U | 11/1992 | (DE) | G01K/7/02 |
| 332396 | * 9/1989 | (EP) | 374/179 |
| 0079218 | * 6/1981 | (JP) | 374/141 |
| 0038826 | * 2/1990 | (JP) | 374/141 |
| 1048059A | 2/1998 | (JP) | G01K/1/14 |

* cited by examiner

Primary Examiner—Diego Gutierrez
Assistant Examiner—Lydia M. De Jesús
(74) Attorney, Agent, or Firm—Norris N. Reinisch; Howrey Simon Arnold & White

(57) ABSTRACT

The invention is a thermocouple installation wherein the thermocouple measures the temperature in a gasification reactor. The thermocouple is installed through the wall of a gasification reactor such that the measuring element is behind a continuous layer of refractory hot face brick. The thermocouple assembly is mounted in a opening made through the gasifier wall, the insulating brick, and optionally a portion of the way through the hotface brick.

20 Claims, 1 Drawing Sheet

BEHIND THE BRICK THERMOCOUPLE

This Application claims priority to Provisional Application No. 60/102,419, filed on Sep. 30, 1998.

FIELD OF THE INVENTION

This invention relates generally to the protection of a thermocouple used in a gasification process and, more particularly, to the use of refractory brick to extend the useful life of thermocouples used in a gasification process.

BACKGROUND OF THE INVENTION

In high temperature gasification processes, a hot partial oxidation gas is produced from hydrocarbonaceous fuels, for example coal, oils, hydrocarbon wastes, and the like. In these processes, the hydrocarbonaceous fuels are reacted with a reactive oxygen-containing gas, such as air or oxygen, in a gasification reactor to obtain the hot partial oxidation gas.

The term "hydrocarbonaceous" as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". Solid, gaseous, and liquid feeds may be mixed and used simultaneously; and these may include paraffinic, olefinic, acetylenic, naphthenic, and aromatic compounds in any proportion. Also included within the definition of the term "hydrocarbonaceous" are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

The term "liquid hydrocarbon," as used herein to describe suitable liquid feedstocks, is intended to include various materials, such as liquefied petroleum gas, petroleum distillates and residue, gasoline, naphtha, kerosene, crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

"Gaseous hydrocarbons," as used herein to describe suitable gaseous feedstocks, include methane, ethane, propane, butane, pentane, natural gas, coke-oven gas, refinery gas, acetylene tail gas, ethylene off-gas, and mixtures thereof.

"Solid hydrocarbon fuels," as used herein to describe suitable solid feedstocks, include, coal in the form of anthracite, bituminous, subbituminous; lignite; coke; residue derived from coal liquefaction; peat; oil shale; tar sands; petroleum coke; pitch; particulate carbon (soot or ash); solid carbon-containing waste materials, such as sewage; and mixtures thereof. Certain types of hydrocarbonaceous fuels, in particular coal and petroleum coke, generate high levels of ash and molten slag.

In the reaction zone of a gasification reactor, the hydrocarbonaceous fuel is contacted with a free-oxygen containing gas, optionally in the presence of a temperature moderator. In the reaction zone, the contents will commonly reach temperatures in the range of about 1,700° F. (930° C.) to about 3,000° F. (1650° C.), and more typically in the range of about 2,000° F. (1100° C.) to about 2,800° F. (1540° C.). Pressure will typically be in the range of about 1 atmosphere (100 Kpa) to about 250 atmospheres (25,000 KPa), and more typically in the range of about 15 atmospheres (1500 Kpa) to about 150 atmospheres (1500 KPa).

In a typical gasification process, the hot partial oxidation gas will substantially comprise H2, CO, and at least one gas from the group $H_2O$, $CO_2$, $H_2S$, COS, $NH_3$, $N_2$, and Ar. Particulate carbon, ash, and/or molten slag typically containing species such as $SiO_2$, $Al_2O_3$, and the oxides and oxysulfides of metals such as Fe and Ca are commonly produced by well known partial oxidation processes in the reaction zone of a free-flow, down-flowing vertical refractory lined steel pressure vessel. An example of such a process and pressure vessel are shown and described in U.S. Pat. No. 2,818,326, which is hereby incorporated by reference.

Thermocouples are commonly used for measuring temperature in these high temperature processes, including the temperature in the gasification reactor. Thermocouples are pairs of wires of dissimilar metals which are connected at both ends. The content of the wires must be sufficiently dissimilar to allow for a difference in electrical potential between them. Except for the junction at the end of the thermocouple, the two wires are electrically insulated from each other in a protective sheath. The electrical insulation is commonly provided by the protective sheath which consists of a temperature resistant electrically insulating material having two non-intersecting holes extending axially through a portion of the length of the sheath, wherein the thermocouple wires are run through the holes and wherein the holes intersect one another only at one point. Typical protective sheath materials include high temperature, high purity ceramics, such as alumina. The holes may be formed by casting the refractory material around the thermocouple wires and sensor.

The basis of operation of a thermocouple is that an electrical potential that exists between connecting metals varies with temperature. The electrical potential is compared to the potential of a real or an artificial standard that represents the same metals at a standard temperature, and the difference in temperature is measured by a voltage measuring instrument placed in the thermocouple circuit or alternatively by a voltage; measuring instrument that is sent signals by a transmitter placed in the thermocouple circuit. The choice of dissimilar metals used for the thermocouple will vary depending on, among other things, the expected temperature range to be measured. For instance, one type of thermocouple commonly employed under the conditions present in a gasification reactor has one wire that contains platinum and about 30% rhodium and a second wire that contains platinum and about 6% rhodium. For a gasification reactor, type B, type R, and type S platinum/rhodium thermocouples are useful.

The thermocouples have very short lifespans in the environment present in a gasification process, particularly in the environment present in the gasification reactor. The relatively short lifespan is due in part to the corrosive atmosphere that prevails during the operation of the gasification reactor. An unprotected thermocouple left in this environment is quickly attacked and rendered useless. Such attack can be most severe when the thermocouple comes into contact with molten slag present in the reactor. Such a thermocouple may be rendered inoperable in minutes.

To alleviate this problem, thermocouples are commonly inserted into a refractory thermowells mounted along the outer wall of a gasification reactor. The refractory thermowells would include barriers of chromia-magnesia, chromia, or similar slag resistant materials, and may incorporate other refractory and non-refractory materials such as $Al_2O_3$, MgO, sapphire, molybdenum, and stainless steel. These refractory thermowells do not make a complete barrier to the atmosphere inside the gasifier. The refractory thermowell does not stand up to pressure, and does not stand up to stress. It is simply a semipermeable mass transfer barrier that protects the thermowell from slag, direct flame, and some hot gases.

When used in a gasification reactor, the thermowell may be introduced by passing it through an opening in the outer wall of the reactor pressure vessel. The thermowell may then pass through a corresponding opening in a refractory material, or series of refractory materials, commonly used to line the inner surface of the reactor pressure vessel. The thermowell may extend into the open space of the reactor or more typically it may be set back at a slight distance from the interior of the reactor.

Unfortunately, positioning the thermocouple inside a thermowell has not provided a complete solution. Over time, molten slag will breach the thermowell. The breach is commonly due to the effects of erosion and corrosion as well as thermal and/or mechanical stress. The breach, typically small initially, allows molten slag to enter the thermowell where it can come in contact with the thermocouple, rendering it useless.

It would therefore be beneficial to have a means to increase the lifespan of thermocouples used in a gasification process.

SUMMARY OF THE INVENTION

The invention is a thermocouple installation wherein the thermocouple measures the temperature in a gasification reactor. The thermocouple is installed through the wall of a gasification reactor such that the measuring element is behind a continuous layer of refractory hot face brick. The thermocouple assembly is mounted in a opening made through the gasifier wall, the insulating brick, and optionally a portion of the way through the hotface brick.

DETAILED DESCRIPTION OF THE INVENTION

Figure 1:
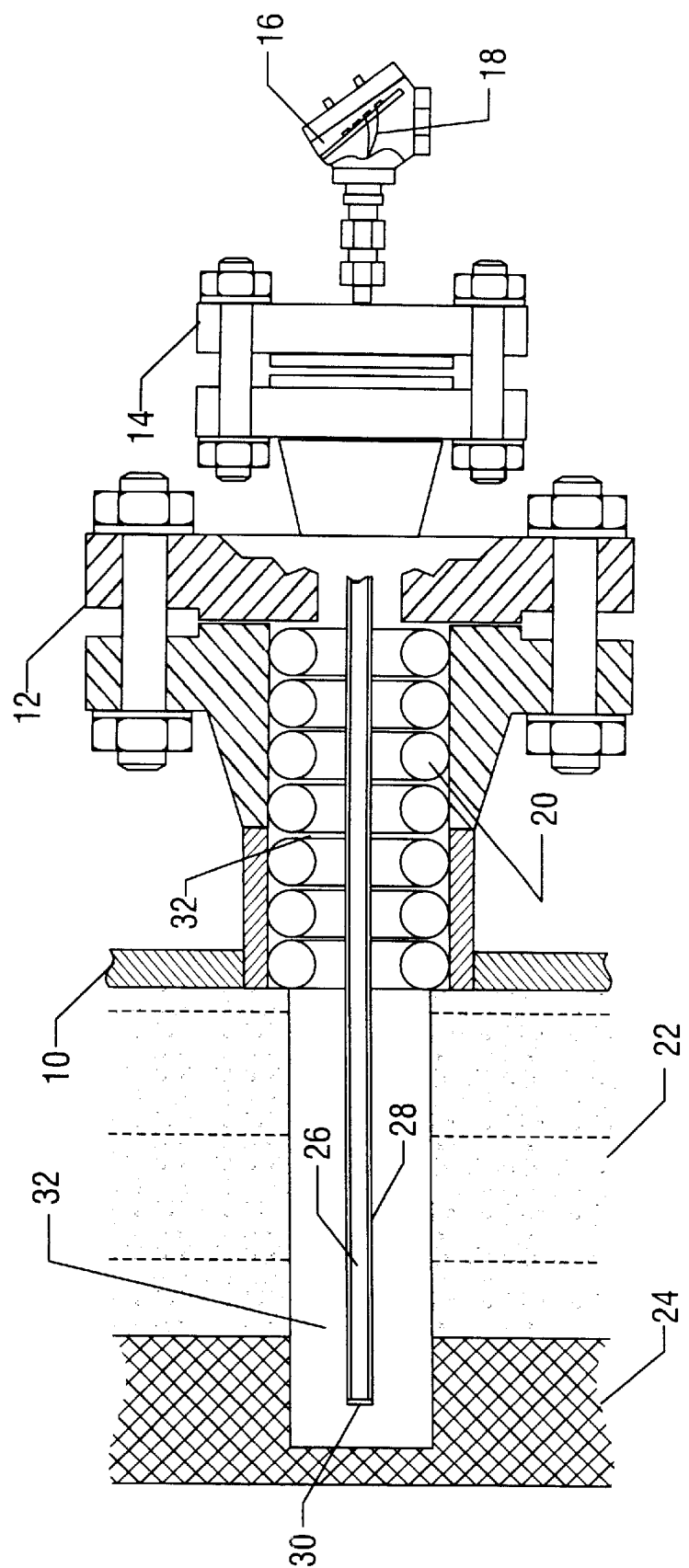
FIG. 1 is a cross-section of a portion of a gasifier wall which shows an embodiment of the invention that has a thermocouple mounted external to the metal gasified shell, extending through the gasifier shell, through the layer or layers of insulating brick, and part way through the hotface brick.

As used herein, the term "thermocouple" is a temperature sensing device that includes the thermocouple sensor and wires and any support, insulation, protection, or mounting means used incident with the thermocouple sensors and wires.

As used herein, the term "hotface brick" is the layer or layers of refractory material or materials adjacent to the interior of the gasifier.

As used herein, the term "thermocouple sensor" describes the point, usually on the distal end of the thermocouple, wherein the dissimilar metals are joined and where the electrical potential is generated.

As used herein, a "thermowell" is a protective sheath that provides substantial barrier to gas flow and is capable of withstanding and sealing against pressure.

As used herein, the terms "sheath" and "protective sheath" are used interchangeably to describe a body that provides support, protection, and electrical insulation for at least one of the thermocouple wires.

As used herein, the term "molten slag" includes slag, ash, metals, silica, and other contaminants that can be fluid at reactor conditions.

In high temperature gasification processes, a hot partial oxidation gas is produced from hydrocarbonaceous fuels, for example coal, oils, hydrocarbon wastes, and the like. In these processes, the hydrocarbonaceous fuels are reacted with a reactive oxygen-containing gas, such as air or oxygen, in a gasification reactor to obtain the hot partial oxidation gas. Gasification reactors are therefore specially designed partial burners. In the reaction zone of a gasification reactor, the hydrocarbonaceous fuel is contacted with a free-oxygen containing gas, optionally in the presence of a temperature moderator. In the reaction zone, the contents will commonly reach temperatures in the range of about 1,700° F. (930° C.) to about 3,000° F. (1650° C.), and more typically in the range of about 2,000° F. (1100° C.) to about 2,800° F. (1540° C.). Pressure will typically be in the range of about 1 atmosphere (100 Kpa) to about 250 atmospheres (25,000 KPa), and more typically in the range of about 15 atmospheres (1500 Kpa) to about 150 atmospheres (1500 KPa).

In many applications the fuel contains significant quantities of ash. At gasification temperatures the ash may be partially or fully molten. It is generally preferred to keep the ash in the molten state until it leaves the gasification reactor. Otherwise, particulate matter can accumulate and plug the reactor. However, this molten ash, or slag, is very harsh to surfaces it contacts. The molten ash attacks refractory brick, and this brick needs to be periodically replaced.

A gasifier must be designed to withstand the pressure within the gasifier. This generally required a metallic shell 10 in FIG. 1. The shell may be steel, molybdenum, or any suitable material. This shell must be capable of withstanding pressures generated in the gasifier at the highest temperature that the shell reaches during operation. At temperatures of about 2000° F. (1100° C.) typical of the interior of a gasifier the strength of steel is severely compromised.

Therefore, there is a layer or layers of insulating brick 22 between the gasification zone and the shell. This insulating brick may be from about 6 inches (15 cm) thick to well over 10 inches (25 cm) thick. The brick is usually present in multiple overlapping layers. The brick is made of any suitable refractory material. It is often alumina, chromia, magnesia, or mixtures thereof. The insulating brick is often cast as lower density material than is the hotface brick.

The thermocouple mount must extend through an opening 32 in the gasifier shell and though the insulating brick. The thermal coefficient of expansion is different between the metallic shell and the insulating brick. Therefore, an the reactor heats and cools, the shell and the insulating brick usually move relative to one another. The opening 32 through the shell and the insulating brick, through which the thermocouple extends, must be of sufficient diameter to allow the movement of the shell, insulating brick, and optionally the hotface brick relative to each other without shearing the thermocouple. In one embodiment of this invention the opening is between about 0.5 inches (1.3 cm) and about 6 inches (15 cm) in diameter. The opening diameter is preferably between about 1 inch (2.5 cm) and about 4 inches (10 cm) in diameter, more preferably between about 1.5 inches (3.8 cm) and about 2.5 inches (6.4 cm) in diameter.

On the inner face of the insulating brick is one or more layers of hotface brick 24. This hotface brick is often similar in composition to the insulating brick, though it is generally higher density than the insulating brick. This hotface brick is more thermally conductive than is the insulating brick. This hotface brick is made of any suitable refractory material, i.e., alumina, chromia, magnesia, or mixtures thereof. This hotface brick is exposed to the gasification zone. For feedstock that has significant quantities of slag, i.e., greater than about 0.1 percent by weight of total feed, then hotface bricks are preferably constructed of more slag-resistant refractory material such as high chromia, magnesia, or mixtures thereof.

The hotface brick layer or layers 24 may range from about 4 inches (10 cm) to about 14 inches (36 cm) thickness. The preferred hotface brick thickness is between about 6 inches (15 cm) to about 12 inches (31 cm), more preferably from about 8 inches (20 cm) to about 10 inches (25 cm).

The thermocouples have very short lifespans in the environment present in a gasification process, particularly in the environment present in the gasification reactor. The relatively short lifespan is due in part to the corrosive atmosphere that prevails during the operation of the gasification reactor. An unprotected thermocouple left in this environment is quickly attacked and rendered useless. Such attack can be most severe when the thermocouple comes into contact with molten slag present in the reactor. Such a thermocouple may be rendered inoperable in minutes.

The thermocouple sensor 30 in the present invention is mounted behind a layer of hotface brick 24. The thermocouple 26, with or without a thermowell, is passed in succession straight through a opening in the steel gasifier shell 10 and then through an aligned opening 32 in the refractory insulating brick 22 and then, optionally, part way through the hotface brick 24.

The temperature response, that is, the time for a change in gasifier temperature to be reflected in the thermocouple response, depends in part on the thickness of the hotface brick layer between the thermocouple and the gasification zone. In addition, the minor insulating effect of the hotface brick will result in the thermocouple mounted behind the hotface brick to read low. The time delay and temperature differential are more pronounced with thicker layers of hotface brick between the thermocouple sensor 30 and the gasifier interior. The thickness of the layer of hotface brick between the thermocouple sensor and the gasifier interior therefore should be less than about 12 inches (31 cm), preferably less than 9 inches (23 cm), more preferably less than about 6 inches (15 cm), and most preferably less than about 4.5 inches (12 cm). At the same time, the hotface brick is attacked by the molten slag and the atmosphere inside the gasifier, and the hotface brick may fail. Failure may be accelerated by stresses caused by the reduced thickness of the hotface brick in front of the thermocouple. Therefore, the thickness of the hot face brick is preferably greater than about 2 inches (5 cm), more preferably greater than about 3.5 inches (8.9 cm). For hydrocarbonaceous feedstock that produces higher quantities of molten slag, i.e., greater than about 0.1 percent by weight slag, the thickness of the hot face brick is preferably greater than about 3.5 inch (8.9 cm), more preferably greater than about 4 inches (10 cm).

These dimensions may differ for various feedstocks. The thickness of hotface brick between opening containing the thermocouple and the gasifier interior may range from about 20% to about 100% of the thickness of the hotface brick, preferably from about 30% to about 66%, and most preferably from about 40% to about 60% of the thickness of the hotface brick to the extent the thickness between the opening and the gasifier interior is less than 100%, it is preferred that the opening extend contiguously from the opening in the insulating brick. The hotface brick viewed from the gasifier interior beneficially will not have substantial quantity of material removed.

A particularly preferred embodiment of the invention has an average hotface thickness of about 8 inches (20 cm) to about 10 inches (25 cm) in thickness, a hotface thickness in front of the thermocouple of between about 3.5 inches (8.9 cm) and about 4.5 inches (11.4 cm), and an opening or opening extending part way through the hotface brick. This opening would be continuous with the opening extending through the shell and the insulating brick. The opening can be cast into the insulating brick and the hotface brick or can be machined into the installed brick. The opening should be sized, and the refractory material mounted, so that the thermocouple will not be sheared due to thermal expansion and movement during heat-up or cool-down of the reactor.

For a four inch thickness of hotface brick in front of the thermocouple, with insulating brick, outer shell, and flange assembly as shown in FIG. 1, there is a 20 to 30 second delay in the response of the thermocouple to temperature changes within the reactor. The thermocouple will also read between about 100° F. (55° C.) and about 300° F. (170° C.) lower than would conventionally mounted thermocouples. However, once known and calibrated, both factors can be accounted for in the operation and control of the reactor.

The thermocouple should be mounted so as to not let the thermocouple sensor 30 touch the refractory 22 and 24. It is preferred that the thermocouple sensor be located between about 0.25 inches (0.6 cm) and about 3 inches (8 cm), more preferably between about 0.5 inches (1.2 cm) and about 1 inch (2.5 cm), from the rear surface of the hotface brick between the thermocouple sensor and the gasifier interior.

The thermocouple 26 is comprised of a pair of wires 18. The wires have dissimilar metal content such that a difference in electrical potential can develop between them when the thermocouple is exposed to a heat source. The wires, for example, may both contain platinum and rhodium as their primary substituents with the amounts of platinum and rhodium being different in the two wires. For example, one of the wires may have about 30% rhodium while the other wire has about 6% rhodium. Alternatively, one wire may be pure platinum and the other wire may contain 10% or 13% rhodium. For both wires, the remainder is primarily platinum.

It is generally preferred to mount the thermocouple sensor at the end of a protective sheath 28. The wires are joined to each other at a hot junction 30 and cold junction (not shown). The terms "hot" and "cold" are used because when employed to measure the temperature of a gasification reactor the hot junction 30 is positioned closer to the heat source. The difference between the electrical potential of the two wires is measured. It is not critical how the difference in potential is measured. In fact, various means are known to those of ordinary skill in the art for measuring the difference in electrical potential. Any of these methods can be used in the present invention. For example, a voltage meter can be placed in the thermocouple circuit. Alternatively, and preferably, the cold junction is provided at a temperature transmitter (not shown). The signal generated by the temperature transmitter can then be relayed to a control room or other location by signal transfer means (not shown).

Except for the hot and cold junctions, the two thermocouple wires are otherwise electrically insulated from each other. While it is not critical how insulated, in this embodiment, the electrical insulation is provided by a high temperature, high purity ceramic insert or cast separate holes within the protective sheath 28.

There are two embodiments of this invention. The first utilizes a thermowell to provide additional protection to the thermocouple. The thermocouple is enclosed in a thermowell extending from the flange. Said thermowell would create a pressure (gas) barrier allowing under some circumstances for the thermocouple to be serviced with the gasifier operating. The gas barrier may not be absolute. For instance, the palladium/silver thermowell described in U.S. Pat. No. 5,005,986, incorporated by reference herein, is permeable to hydrogen. The thermowell nevertheless under some conditions allows the thermocouple to be at essentially atmospheric pressure. However, a drawback is that the thermowell extends into the reactor, and a breach in the hotface brick will allow corrosive erosive molten slag to directly attack the pressure barrier. Therefore, this is not a preferred embodiment of the invention.

The thermocouple and thermowell assembly are held in place by screwing, bolting or clamping the thermowell to the thermocouple flange 14. The use of two separate connections provides for increased efficiency in that a thermocouple 26 can be replaced without removing the thermowell.

Alternatively, protective sheaths 28 can be used to protect the thermocouple without forming a pressure seal. At some point the thermocouple wires must exit the pressurized vessel. The wires pass through a pressure sealing fitting which contacts a bushing which fits into a removable flange 14. The flange 14 mates with a reducer flange 12 that is mated to the outer steel wall 10 of the pressure vessel gasification reactor.

It is preferred that the pressure seal about the thermocouple wires be made at a location where the temperature is considerably reduced from the gasifier temperature, i.e., less to 1000° F. (540° C.) or less, preferably less than 600° F. (320° C.), more preferably less than about 400° F. (200° C.). The pressure seal will therefore not be subject to attack by molten slag in the event of a breach in the hotface brick. Slag will solidify and not reach the pressure seal. In addition, elastomers or other pressure sealing connectors generally have a longer lifespan if not exposed to temperatures that exist in a gasifier. The pressure seal is generally made near or within the thermocouple flange 14.

The protective sheath is generally made of any suitable refractory material, i.e., alumina, chromia, magnesia, or mixtures thereof. The protective sheath will not be exposed to molten slag, however, and can therefore be made with the less expensive alumina even though the reactor may contain molten slag. The protective sheath generally contains an insulator running between the two electrical connectors. In a preferred embodiment, the protective sheath has holes through the length of the protective sheath wherein the thermocouple wires are run through the holes and wherein the holes do not intersect one another except at one point where the wires join.

In addition to the protective sheath, any other protective sheath commonly used or subsequently developed by one of ordinary skill in the art can be employed. An, additional protective sheath surrounding the thermocouple sensor and protective sheath, may be preferred. Such sheaths may include barriers of refractory and/or non-refractory materials such as $Al_2O_3$, MgO, chrome-magnesia, high chrome, molybdenum, stainless steel, or mixtures or combinations thereof. By combinations it is meant two or more dissimilar materials in the same sheath.

In an embodiment of this invention, a protective sheath may be comprised of an inner protection sheath and an outer protection sheath. The inner protection sheath can be formed from a high density low porosity refractory, such as alumina or magnesia. A castable refractory material, typically a high density low porosity refractory, is then poured around the inner protection sheath and allowed to set so as to form the outer protection sheath around all but the opening of the inner protection sheath. Preferably, this castable high density low porosity refractory material is comprised of chromium oxide or chromia-magnesia.

The hotface brick does not form a pressure seal. Therefore, there must be a flange or flanges 12 and 14, or other suitable assembly for sealing off pressure. It would be beneficial for this assembly to be removable so that the thermocouple can be serviced as needed. At least one flange is the preferred means of making the gasifier gas-tight by sealing the opening in the gasifier shell, and at the same time providing a means to remove the thermocouple for service. Instead of mating flanges, threaded caps and nozzles or other connection means can be used.

The flange is beneficially protected from radiant heat emanating from the hotface brick and the insulating brick. Otherwise the flange may be excessively hot. One protective method is to have a flange attached outwardly from the gasifier shell and an opposing flange, with the thermocouple extending through the flange, and at least one, and preferably a plurality, of washer devices 20 within the flange body circling the protective sheath. These washer devices, which may have the appearance of donuts, circle the protective sheath. It is preferred that these washers or donuts be made of a pliable insulating material. Donuts made of kaowool are particularly preferred. Thin pliable barriers 32 located between these donuts or washers are also beneficial.

These donuts, washers, and thin pliable barriers seal the opening from radiant heat. emanating from the hotface brick. This hotface brick acts like a black body and can radiate heat along the path that the protective sheath runs in. Protective sheaths are generally straight. By blocking this radiant heat, the point where the protective sheath exits a pressure seal, and is tied in to more conventional wire, may be kept below about 1000° F. (540° C.), preferably below about 400° F. (200° C.). These donuts, washers, and thin pliable barriers also form a partial barrier to convective heat flow.

The use of a reducing flange 12 allows the thermocouple to be removed and serviced with minimum disturbance of these donuts, washers, and thin pliable barriers. The thermocouple itself, in this embodiment, is mounted on the thermocouple flange 14. External to this thermocouple flange the temperature may be sufficiently reduced so that the thermocouple leads may be joined to conventional high temperature wire, for example by a terminal block 16 inside conduit. This conduit may have a gas seal to prevent gas from migrating unimpeded to, for example, a control room. The pressure seal between the pressurized gasification reactor and the atmospheric conduit is preferably made in or adjacent to the thermocouple flange 14.

Locating the thermocouple behind hotface brick in accordance with the various embodiments of the invention, amongst other advantages, increases the useful life of the thermocouple over conventional thermocouples encased in slag resistant protective sheaths.

In another embodiments, more than one thermocouples are inserted into a cavity 32 behind the hotface brick, having at least a corresponding number of inner protection sheaths.

In such an embodiment, the distal ends 30 of the one or more thermocouples are advantageously positioned at different points along the length of the protective sheath, or the protective sheaths extend into the cavity to different depths. It is preferred that the depths where the thermocouple sensor is differ by 2 inches (5 cm) or more from the face of the hotface brick. For example, in an embodiment in which two thermocouples are used, slag ultimately penetrating the protective sheath will generally reach the thermocouple positioned closest to the tip first. This thermocouple will subsequently fail. It then takes an additional amount of time for the slag to reach and cause the failure of the second thermocouples. Thus, the process can be run longer, and the shut-down and work-over of the gasifier can be planned in advance, without need for an emergency shut down. While the accuracy provided by the second thermocouple is not as good as the first thermocouple, the difference does not pose a problem for process control as the readings for the second thermocouple may be corrected based on data gathered prior to the failure of the first thermocouple.

In another embodiment of the invention, there can be one or more other means of measuring gasifier temperature, including but not limited to traditional thermocouples in protective sheaths and optionally thermowells located in holes extending through the hotface brick, said sheaths being of any refractory materials mention or of materials subsequently found suitable. The convergence of the temperature recorded by the thermocouple located behind the hotface brick with the temperature of the thermocouple more directly exposed to the gasifier environment can be used to evaluate the condition of the hotface brick. For example, if the thermocouples behind the hotface brick that normally read 200° F. (110° C.) lower than the thermocouples more completely exposed to the gasifier interior get closer, for example to reading 100° F. (55° C.) lower than the thermocouples more completely exposed to the gasifier interior, than this is evidence of thinning of the layer of hotface brick. If the two measurements read the same, this is evidence of a substantial breach of the hotface brick. Finally, if the thermocouple ceases operation due to slag attack, this is evidence of breach of the hotface brick by slag at least to the depth of the hotface brick between the thermocouple and the gasifier interior. Knowledge of the failure of the hotface brick before the problem becomes acute can result in a more orderly shutdown and time to prepare for maintenance during the shutdown.

What is claimed is:

1. A thermocouple installation in a reactor, said reactor gasifying hydrocarbonaceous material and containing molten slag and comprising a shell, at least one insulating brick layer, at least one hotface brick layer, and a reaction zone, the hotface brick further having a front face and a rear face, the front face being in direct contact with the reaction zone of the gasifier, and the rear face being backed by the insulating brick, said thermocouple installation comprising a thermocouple sensor and wires encased in a protective sheath extending through an opening in the gasifier shell and insulating brick, but said opening not extending completely through the hotface brick.

2. The thermocouple installation of claim 1, wherein said protective sheath comprises alumina, chromia, magnesia, or mixtures thereof.

3. The thermocouple installation of claim 1, wherein said protective sheath comprises alumina.

4. The thermocouple installation of claim 1, wherein said protective sheath comprises holes extending axially through a portion of the length of the sheath, wherein the thermocouple wires are run through the holes and wherein the holes intersect one another only at one point.

5. The thermocouple installation of claim 1 wherein the thermocouple sensor is positioned between about 0.25 and about 3 inches from the rear face of the hotface brick between the thermocouple sensor and the gasifier reaction zone.

6. The thermocouple installation of claim 1 wherein the thermocouple sensor is positioned between about 0.5 and about 1 inch from the rear face of the hotface brick between the thermocouple sensor and the gasifier reaction zone.

7. The thermocouple installation of claim 1 wherein the opening is between about 1 and about 4 inches in diameter.

8. The thermocouple installation of claim 1 wherein the opening is between about 1.5 and about 2.5 inches in diameter.

9. The thermocouple installation of claim 1 wherein the thickness of the layer of hotface brick between the thermocouple sensor and the gasifier reaction zone is between about 2 inches to about 9 inches.

10. The thermocouple installation of claim 1 wherein the thickness of the layer of hotface brick between the thermocouple sensor and the gasifier reaction zone is between about 3.5 inches to about 6 inches.

11. The thermocouple installation of claim 1 wherein the thickness of the layer of hotface brick between the opening and the gasifier reaction zone is between about 3.5 inches to about 4.5 inches when molten slag of about 0.1% by weight or more of the hydrocarbonaceous material is present.

12. The thermocouple installation of claim 1 wherein the opening extends part way through the hotface brick, the thickness of the hotface brick between the opening and the gasifier interior is between about 3.5 inches to about 6 inches, and the thickness of the hotface brick is otherwise between about 8 inches and about 10 inches.

13. The thermocouple installation of claim 1 further comprising encasing the thermocouple wires and sensor in a plurality of protective sheaths including an innermost protective sheath and an outermost protective sheath.

14. The thermocouple installation of claim 13 wherein the innermost protective sheath is comprised of alumina, magnesia, chrome-magnesia, high chrome, or mixtures thereof, and wherein the outermost protective sheath is comprised of alumina, magnesia, chrome-magnesia, high chrome, molybdenum, stainless steel, or mixtures or combinations thereof.

15. The thermocouple installation of claim 14 wherein the inner protective sheath is formed from alumina or magnesia or a mixture thereof, and wherein the outer protective sheath is comprised of chromium oxide or chromia-magnesia cast around the inner protective sheath.

16. The thermocouple installation of claim 1 further comprising encasing the thermocouple in a thermowell.

17. The thermocouple installation of claim 1 further comprising a flange attached outwardly from the gasifier shell and an opposing reducing flange, with the thermocouple extending through both flanges, and the gasifier shell flange further comprising at least one washer device within circling the protective sheath.

18. The thermocouple installation of claim 17 wherein said at least one washer device being comprised of kaowool.

19. The thermocouple installation of claim 1 further comprising a plurality of thermocouple sensors and wires encased in one or more protective sheaths, wherein the thermocouple sensors are at predetermined distances from the front face of the hotface brick, and wherein said distances differs from another by at least 2 inches.

20. A thermocouple installation in a reactor, said reactor being a gasifier, gasifying hydrocarbonaceous material and containing molten slag and comprising a shell, at least one insulating brick layer, and at least one hotface brick layer, said thermocouple installation comprising a thermocouple sensor and wires encased in a protective sheath extending through an opening in the gasifier shell and insulating brick, wherein the thickness of hotface brick between the opening containing the thermocouple sensor and the gasifier reaction zone is from about 20% to about 100% of the thickness of the hotface brick adjacent to the hotface brick between the opening containing the thermocouple sensor and the gasifier reaction zone.

* * * * *

UNITED STATES PATENT AND TRADEMARK OFFICE
CERTIFICATE OF CORRECTION

PATENT NO.   : 6,302,578 B1
DATED        : October 16, 2001
INVENTOR(S)  : John S. Stevenson, Kent W. Santos and Gush Zachariou It is certified that error appears in the above-identified patent and that said Letters Patent is hereby corrected as shown below:

<u>Title page,</u>
Items please correct as follows:
[73] Assignee: delete "Plain" and insert -- Plains --
[74] *Attorney, Agent, or Firm*: delete "Norris" and insert -- Morris --

Signed and Sealed this

Twenty-eighth Day of May, 2002

Attest:

JAMES E. ROGAN
*Attesting Officer*  *Director of the United States Patent and Trademark Office*